United States Patent [19]
Brandon et al.

[11] Patent Number: 5,551,063
[45] Date of Patent: Aug. 27, 1996

[54] METHOD AND APPARATUS FOR ESTABLISHING A PRIVATE CONVERSATION FOR MORE THAN TWO MOBILE UNITS IN A TRUNKED SYSTEM

[75] Inventors: Jeffrey J. Brandon, Ft. Lauderdale; Thomas R. Moder, Coral Springs, both of Fla.

[73] Assignee: Motorola, Inc., Schaumburg, Ill.

[21] Appl. No.: 237,573

[22] Filed: May 3, 1994

[51] Int. Cl.$^6$ .................................................. H04B 7/26
[52] U.S. Cl. ...................... 455/54.2; 455/34.1; 455/53.1
[58] Field of Search .................................. 455/33.1, 34.1, 455/54.1, 53.1, 54.1, 54.2, 56.1, 58.1, 11.1, 15, 17

[56] References Cited

U.S. PATENT DOCUMENTS 4,144,497  3/1979  Andrea, III ............................ 455/58.1
5,126,733  6/1992  Sager ..................................... 455/38.1

OTHER PUBLICATIONS

Motorola, Inc., MTX8000 Trunked Portable Radios data sheet, 1992 Publication.

*Primary Examiner*—Reinhard J. Eisenzoof
*Assistant Examiner*—Thanh Le
*Attorney, Agent, or Firm*—Barbara R. Doutre

[57] ABSTRACT

A method for establishing a private group conversation includes the step of sending a message from a first radio requesting that an exclusive channel be established with a second radio (step 302). Once the exclusive channel has been established, either one of the first or second radios can then send a message to the system controller (104) requesting that a third radio be added to the conversation taking place via the exclusive channel (step 306).

14 Claims, 3 Drawing Sheets

METHOD AND APPARATUS FOR ESTABLISHING A PRIVATE CONVERSATION FOR MORE THAN TWO MOBILE UNITS IN A TRUNKED SYSTEM

TECHNICAL FIELD

This invention relates generally to the field of radio communication systems and, more particularly, to a method and apparatus for establishing a confidential group conversation in a radio communication system.

BACKGROUND

Trunked radio systems, such as the PRIVACY PLUS™ radio system manufactured by Motorola, Inc., allocate a plurality of communication resources (e.g., radio communication channels) amongst a group of radio users. A communication resource controller or control system, also commonly known as the trunked central controller transmits control information to radios operating in the system, usually over a control resource (also known as the control channel). A trunked radio scanning a particular control channel detects instructions from the central controller that might, for example, instruct the radio to shift to a particular communication channel whereupon the radio can transmit and receive voice and/or data information on the particular channel. Other trunked radio systems do not utilize a dedicated control channel and transmit the control information over all or select ones of the communication channels available in the system.

One particular feature known as PRIVATE CONVERSATION™ in the PRIVACY PLUS™ radio system is one in which two radio users in the system can establish a confidential, or one-to-one conversation using one of the communication channels available in the trunked radio system. During the time that the two radios are using this feature, no other radios in the trunked radio system can listen in on the conversation, thus allowing for the two radio users to have a confidential conversation.

A need exists in the art for a method and apparatus which would allow for the establishment of an exclusive and confidential communication link between more than two radios in a trunked radio system. Such a method and apparatus would allow a particular radio user to establish a conversation with a group of radio users he has selected and still be able to maintain the privacy of the conversation.

DETAILED DESCRIPTION OF THE PREFERRED EMBODIMENT

Figure 1:
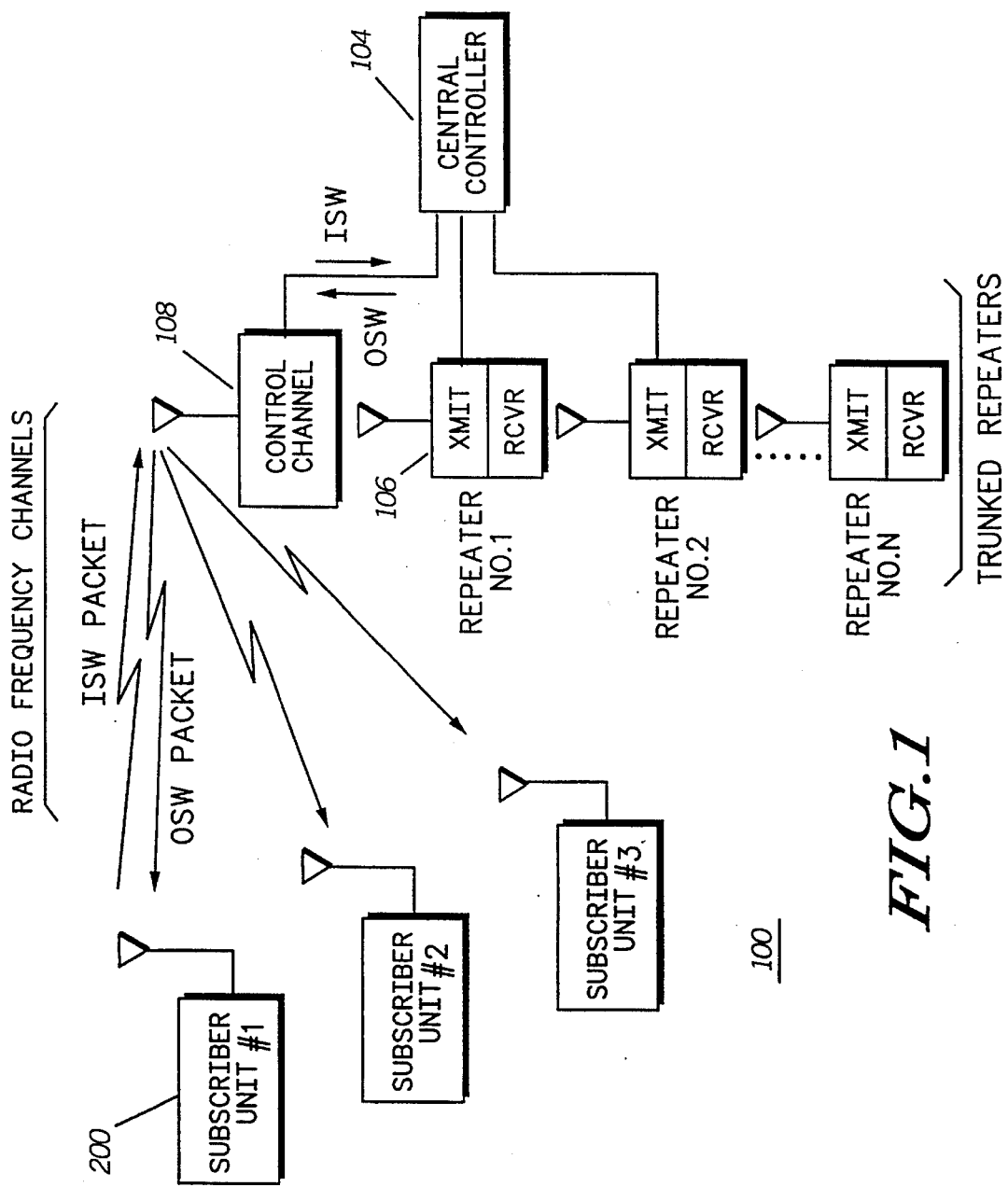
FIG. 1 is a representation of a trunked communication system such as could utilize the present invention.

Referring to FIG. 1, a representation of a trunked communication (radio) system 100 according to the present invention is shown. The trunked radio system 100 consists of a control system which is commonly referred to as a central controller or system controller 104 which controls the assignment of radio frequency repeaters 106 to different groups of subscriber units (radios) 200. To better understand the system 100, an example of the sequence of events for a standard radio group call will be described. When one of the radios 200 (i.e. in radio group A) that is in the system 100 presses his Push-to-talk button ("PTT") a data message is transmitted to the central controller 104 via the system control channel 108.

The data message sent by (Inbound signaling word or "ISW") constitutes a request for a voice channel. Preferably, any of the repeaters 106 except the one acting as the control channel 108 can be a voice/data channel 106. The central controller 104 reviews the status of all the repeaters 106 and assigns an unused repeater 106 by sending an outbound signaling word ("OSW") via the control channel 108 directing all radios 200 in group A to a frequency corresponding to one of the repeaters 106 (i.e. repeater No.1 or also known as channel No.1). The OSW is received by all radios 200, but only the radios 200 in group A will be transferred to repeater No.1 (106). The other radios 200 in the system will continue to monitor the control channel 108. The individual radio which activated the PTT is now able to talk to any or all radios 200 in his group over repeater No.1 (106).

Figure 2:
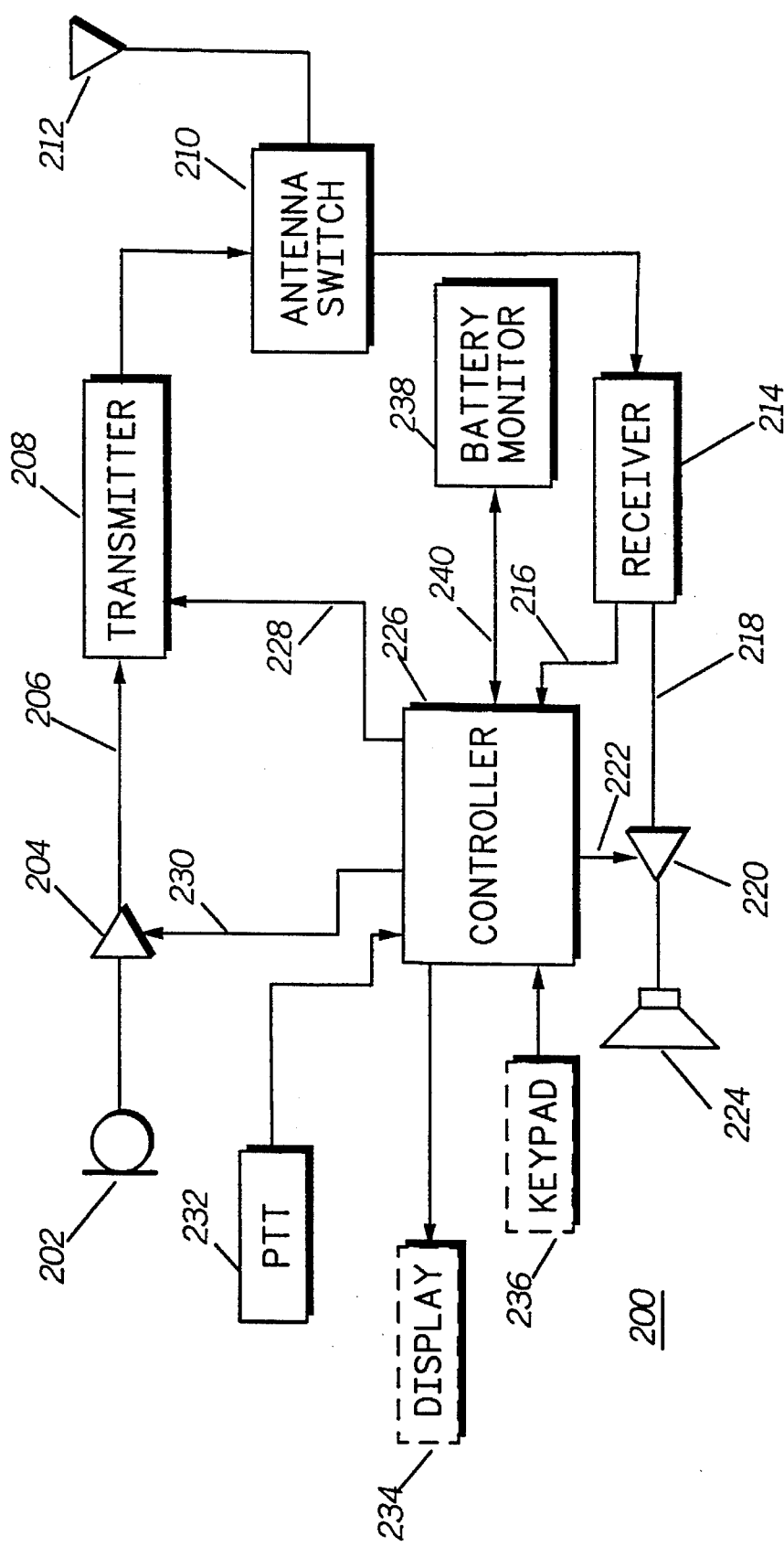
FIG. 2 is a block diagram of a radio in accordance with the present invention.

In FIG. 2, a block diagram of a subscriber unit or trunked radio transceiver 200 such as a trunked portable or mobile radio capable of operating in a trunked system is shown. In accordance with the present invention, the radio 200 includes a receiver 214, and an antenna switch 210 to selectively couple the antenna 212 to either the receiver 214 or transmitter 208. Both the receiver 214 and transmitter 208 are of conventional design as known in the art. To receive a message, a radio frequency signal is routed from the antenna 212 to the receiver 214. The receiver provides radio information signals to the controller 226 in the form of data messages via line 216. The receiver 214 can also provide voice messages via line 218 which is coupled to amplifier 220 for presentation to the speaker 224. The amplifier's 220 gain can be controlled by the controller 226 via line 222.

The controller 226, which is a well known microcontroller, includes on-chip timer circuitry, control circuitry, memory, serial interface, and capable of interfacing to external memory devices if necessary. The controller 226 processes the incoming data from the receiver 214 using conventional decoding techniques known in the art. A transmitter 208 is also provided in radio 200 in order to transmit ISW's to the central controller 104. When a transmission is required, the radio controller 226 sends data messages via line 228 which are then transmitted by transmitter 208. Alternatively, voice messages can be transmitted as well. The radio user speaks into microphone 202 after "keying up" the transmitter by pressing the push-to-talk (PTT) 232 which activates transmitter 208. The voice message gets amplified by amplifier 204 which can be controlled by the controller via line 230. The voice messages are then coupled to transmitter 208 via line 206. The radio 200 can also have a display 234 and a keypad 236 which are coupled to controller 226 for added flexibility.

Figure 3:
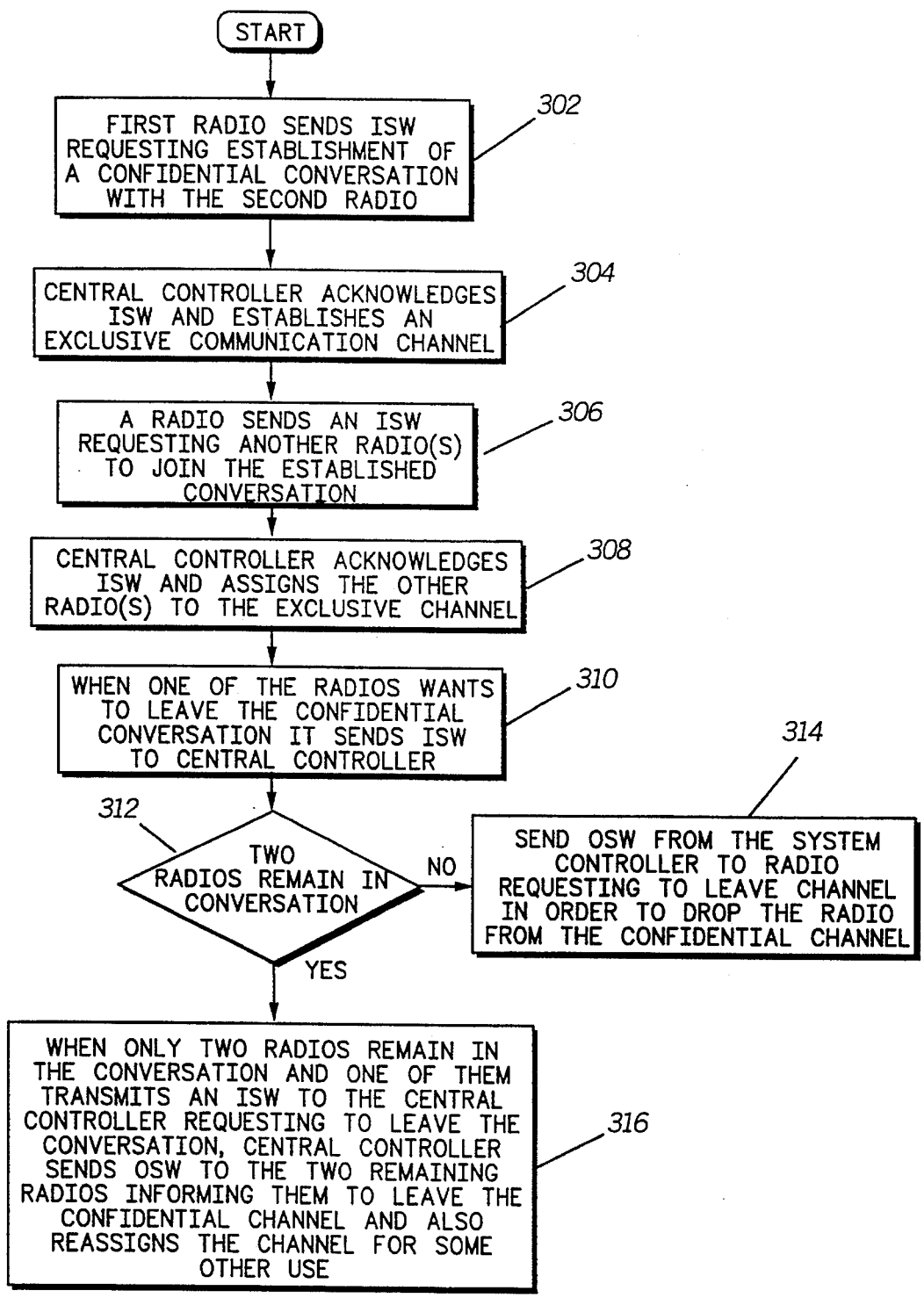
FIG. 3 is a flowchart showing the steps in establishing a confidential group conversation in accordance with the present invention.

Referring now to FIG. 3, a flowchart showing the steps used in establishing a confidential group conversation in accordance with the present invention is shown. In step 302, a first portable radio (radio #1 shown in FIG. 1) requests that a confidential conversation be established by transmitting an ISW packet to the central controller 104 requesting that central controller 104 assign one of the repeaters 106 as the exclusive or confidential radio frequency channel for use in the conversation. System or central controller 104 prevents any radio not assigned to the confidential channel from listening in on any messages transmitted over the channel thereby maintaining the privacy of any conversations taking place over that particular channel.

Step 302 is typically accomplished by a radio user activating some keys in a keypad which is part of the radio and transmitting the ISW by pressing the radio's PTT. Also included as part of the ISW packet, is information as to which radio the first radio wants to have an exclusive conversation with. For illustration purposes, we will assume that the first radio (radio #1 shown in FIG. 1) 200 wants to establish a one-to-one conversation with the second radio (radio #2 shown in FIG. 1).

In response to the ISW from the first radio, central controller 104 in step 304, transmits an OSW via control channel 108 to the first radio informing it to use the No. 2 repeater (as an example) as an exclusive communication channel for its conversation with the second radio. The OSW also informs the second radio to go to the frequency assigned to the No. 2 repeater in order for the first and second radios to have a one-to-one confidential conversation. In step 306, either the first or second radio can request that one or more of the other radios in the trunked system to join in on the exclusive conversation by transmitting an ISW packet to the central controller 104 requesting that certain radio(s) join the conversation. Step 306 can be preferably performed by the user of the first or second radio using a routine in the radio which allows the radio user to select one or more radios (e.g., using a keypad on the radio in order to select the radio identification numbers) which are to join the ongoing confidential conversation. In step 308, the central controller 104 receives the ISW message and assigns the radio(s) requested to be part of the conversation to the exclusive communication channel by transmitting an OSW message to the radio(s). The OSW message transmitted by the central controller 104 directs the radio(s) to be joined to the private group conversation to go to the assigned communication channel in order for them to join the ongoing conversation with the original two radios. Preferably, once any radio enters into the group private conversation it can also send an ISW message as in step 306 requesting that another radio also be joined to the conversation.

Anytime one of the radios which is part of the group private conversation wants be dropped from the conversation it transmits an ISW message in step 310 to the system controller 104, informing the system controller that the radio wants to be removed. In step 312, the system controller 104 in response to receiving the ISW determines if two radios remain in the confidential channel. This step is performed by the system controller 104 determining from its database how many radios are presently assigned to the confidential communication channel. If in step 312, more than two radios remain using the confidential communication channel, the central controller 104 transmits an OSW message in step 314 directed to the radio which requested to be dropped from the conversation, informing the radio to leave the assigned private group conversation channel and return to monitoring the control channel 108. If in step 312, it is determined that only two radios remain in the private group conversation, the system controller 104, in step 316, informs both remaining radios via an OSW message to leave the assigned private group conversation channel and return to monitoring the control channel 108. Step 316 is performed in response to receiving an ISW message from either of the two remaining radios requesting that one of them be removed (dropped) from the confidential communication channel. The central controller also as part of step 316 reassigns ("drops") the assigned confidential communication channel from its table of channels (repeaters) in use in order to have the communication channel available for assignment for some other use later on.

In summary, the present invention provides for a method and apparatus for allowing a group private conversation to take place in a trunked radio frequency communication system. The invention allows for more than two radios to have a confidential conversation with each other without the radios worrying that other radios in the system are listening in on the conversation. Implementation of the present invention can be done in the framework of existing analog or digital signaling protocols by appropriate modification to both the central controller and radio (subscriber unit) operating software.

What is claimed is:

1. A method for establishing a group private conversation in a trunked radio frequency system including at least first, second and third radios, a plurality of communication channels, and a system controller, the method comprising the steps of:
   (a) transmitting a first message from the first radio to the system controller requesting that a confidential communication channel be established so that the first radio can communicate with the second radio;
   (b) selecting one from among the plurality of communication channels as the confidential communication channel to be used to establish a communication link between the first and second radios; and
   (c) transmitting a second message from either the first or second radio to the system controller requesting that the third radio join the communication link established on the confidential communication channel.

2. A method for establishing a group private conversation as defined in claim 1, wherein step (b) comprises having the system controller choose from among the plurality of communication channels one communication channel as the confidential communication channel.

3. A method for establishing a group private conversation as defined in claim 2, further comprising the step of:
   (d) transmitting a message from the system controller to the first and second radios after step (b) has been performed informing the first and second radios that a confidential communication channel has been selected and informing the first and second radios to use the confidential communication channel as the communication link between the radios.

4. A method for establishing a group private conversation as defined in claim 1, comprising the further steps of:
   (d) transmitting a third message to the system controller from one of said first, second or third radios requesting that the radio be removed from the private group conversation; and
   (e) transmitting a fourth message from the system controller to said radio that transmitted the third message in step (d) informing the radio to leave the confidential communication channel.

5. A method for establishing a group private conversation as defined in claim 4, comprising the further steps of:
   (f) transmitting a fifth message to the system controller after step (e) has been performed from one of the two remaining radios requesting that the radio be removed from the private group conversation;
   (g) transmitting a sixth message from the system controller in response to the fifth message transmitted in step (f) informing the two remaining radios to leave the confidential communication channel; and
   (h) having the system controller reassign the confidential communication channel for some other use.

6. A trunked radio communication system having a system controller and a plurality of communication channels, comprising:

first, second and third radios each having a transmitter and receiver for transmitting and receiving messages;

a system controller;

a plurality of radio frequency repeaters each providing a radio frequency communication channel, the plurality of repeaters are under the control of the system controller;

the system controller, in response to the reception of a first message from the first radio, assigning one of the plurality of radio frequency repeaters as the repeater that provides a confidential communication channel for establishing a communication link between the first and second radios; and the system controller assigning the third radio to the confidential communication channel in response to receiving a second message from either the first or second radios thereby joining the third radio to the communication link established between the first and second radios.

7. A trunked radio frequency communication system as defined in claim 6, wherein said one of the plurality of radio frequency repeaters is designated as the system control channel and all messages sent between said first, second and third radios and the system controller are sent via the system control channel.

8. A trunked radio frequency communication system as defined in claim 6, wherein the at least one of the first, second or third radios comprises a portable trunked radio.

9. A trunked radio frequency communication system as defined in claim 6, wherein the at least one of the first, second or third radios comprises a mobile trunked radio.

10. A method for establishing an exclusive communication channel between a plurality of radios operating in a trunked radio communication system, comprising the steps of:

(a) transmitting a first message from one of the plurality of radios requesting that an exclusive communication channel be assigned;

(b) providing the exclusive communication channel in response to the first message transmitted in step (a);

(c) establishing a communication link between the radio that transmitted the first message in step (a) and another radio from among the plurality of radios using the exclusive communication channel; and (d) transmitting a second message from one of the two radios using the exclusive communication channel in step (c) requesting that a third radio from among the plurality of radios join the communication link established on the exclusive communication channel.

11. A method as defined in claim 10, comprising the further step of:

(e) allowing the third radio to join the two radios using the exclusive communication channel in response to the second message transmitted in step (d).

12. A method as defined in claim 10, comprising the further step of:

(e) dropping one of the three radios using the exclusive communication channel from the exclusive communication channel in response to one of the three radios transmitting a third message requesting that the radio be disconnected from the exclusive communication channel.

13. A method as defined in claim 12, further comprising the step of:

(f) dropping the exclusive communication channel by having one of the remaining two radios using the exclusive communication channel in step (e) transmit a fourth message requesting that the radio be disconnected from the exclusive communication channel.

14. A method as defined in claim 10, wherein the first message in step (a) is directed to a system controller which controls the operation of the trunked radio communication system.

* * * * *